US007109957B2

(12) United States Patent
Yang

(10) Patent No.: US 7,109,957 B2
(45) Date of Patent: Sep. 19, 2006

(54) DIGITAL DISPLAY DRIVING CIRCUIT FOR LIGHT EMITTING DIODE DISPLAY

(75) Inventor: Chien-Sheng Yang, Taipei (TW)

(73) Assignee: AU Optronics Corp., Hsinchu (TW)

( * ) Notice: Subject to any disclaimer, the term of this patent is extended or adjusted under 35 U.S.C. 154(b) by 314 days.

(21) Appl. No.: 10/436,283

(22) Filed: May 13, 2003

(65) Prior Publication Data

US 2004/0119667 A1 Jun. 24, 2004

Related U.S. Application Data

(63) Continuation-in-part of application No. 09/235,265, filed on Jan. 22, 1999, now Pat. No. 6,271,822.

(30) Foreign Application Priority Data

Dec. 20, 2002 (TW) .............................. 91136861 a

(51) Int. Cl.
  *G09G 3/32* (2006.01)
(52) U.S. Cl. .......................... 345/82; 345/11
(58) Field of Classification Search .................. 345/1, 345/87, 88, 89, 99, 100, 211, 213, 1.1, 3.1, 345/11, 28, 82, 83, 84, 91, 96
  See application file for complete search history.

(56) References Cited

U.S. PATENT DOCUMENTS

| 5,603,104 A | * | 2/1997 | Phelps et al. ............... 455/90.3 |
| 6,271,822 B1 | * | 8/2001 | Chiang ......................... 345/99 |
| 6,891,525 B1 | * | 5/2005 | Ogoro ......................... 345/102 |
| 2001/0013854 A1 | * | 8/2001 | Ogoro ......................... 345/102 |
| 2002/0118155 A1 | * | 8/2002 | Fluhrer ........................ 345/87 |
| 2002/0149545 A1 | * | 10/2002 | Hanayama et al. ............ 345/7 |
| 2003/0151586 A1 | * | 8/2003 | Mori et al. .................. 345/101 |
| 2004/0104910 A1 | * | 6/2004 | Mori et al. .................. 345/212 |

* cited by examiner

*Primary Examiner*—Bipin Shalwala
*Assistant Examiner*—Nitin Patel
(74) *Attorney, Agent, or Firm*—Troxell Law Office, PLLC

(57) ABSTRACT

A digital display driving circuit is provided for driving a light emitting diode (LED) display to generate video images. The digital display driving circuit comprises a digital gamma-correction circuit for performing a digital gamma-correction process on the digitized video data to produce the desired video signals. An LED timing control circuit is applied for converting a plurality of timing signals into an LED timing control signal. And a PWM and shutdown circuit is applied for supplying power to the LED display and shutting down the LED display when the LED display has been idle for a preset period.

12 Claims, 2 Drawing Sheets

DIGITAL DISPLAY DRIVING CIRCUIT FOR LIGHT EMITTING DIODE DISPLAY

CROSS-REFERENCE TO RELATED APPLICATIONS

The application is a continuation in part of Ser. No. 09/235,265, now U.S. Pat. No. 6,271,822 to Chiang Tsung-Pei, entitled "Digital liquid crystal display driving circuit" filed on Jan. 22, 1999, and issued Aug. 7, 2001, the entirety of which is hereby incorporated by reference herein.

FIELD OF THE INVENTION

The present invention relates to light emitting diode displays (LED), and more particularly, to a digital display driving circuit for driving an LED display to display video images. In practice, the digital display driving circuit of the invention can be implemented in an LSI (large scale integration) integrated circuit that processes the video signal and associated control signals in a digital manner such that the driving circuit can be operated without laborious analog adjustments and allow the displayed video image to have higher fidelity.

BACKGROUND OF THE INVENTION

With rapid advancement of the fabrication technology of thin film transistors (TFT), the new generation of LED displays are largely applied in various portable electronic products due to the fact it has advantages of higher emitting efficiency, higher responding rate, non-restriction of view angle, smaller size, less weight and lower power consumption.

However, the conventional digital display systems, such as digital cameras, image telephones, video CD (compact disc) players, global positioning systems (GPS), and so on, are typically provided with a cathode ray tube television (CRT TV) in conjunction with a digital display panel, such as LCD or LED displays, for displaying video images. The CRT TV is a display device which is devised to process composite video signals (abbreviated as Cvideo) in compliance with standard television standards, such as the NTSC (National Television System Committee), SECAM (Sequential Chrominance And Memory), and PAL (Phase Alternation by Line) standards. A Cvideo signal is composed of a horizontal synchronizing signal (Hs), a vertical synchronizing signal (Vs), a clock signal (CLK) and the RGB signals of the video image.

FIG. 1 is a schematic block diagram of a conventional display driving circuit for driving a CRT TV and an LED display to generate video images. As shown, a composite synchronizing signal generator 102 is used to combine a horizontal synchronizing signal and a vertical synchronizing signal generated by a central process unit (CPU) 100, and a clock signal (CLK) generated by a timing control circuit 101, into a composite synchronizing signal (Csync). Meanwhile, the data of a digital dot matrix (i.e., the video image to be displayed on the CRT TV and LED display) stored in a display memory unit 103 are converted by the digital-to-analog (D/A) converter 104 into analog form and then transferred to the video encoder 105.

The video encoder 105 then processes the analog output from the D/A converter 104 and the Csync signal from the composite synchronizing signal generator 102 to thereby produce a composite video signal Cvideo. The Cvideo signal is applied directly to drive the CRT TV to display the video image. It is also transferred to the LED driving circuit (the bottom part of the circuit of FIG. 1) for further processing to obtain a suitable signal form that can be applied to drive the LED display.

Alternately, the Cvideo signal can be generated through another method, for which the circuit components involved are drawn in dashed lines in FIG. 1. As shown, a digital encoder 106 can be used to process the output of the timing control circuit 101 and the digital dot matrix data stored in the display memory unit 103 to thereby generate the Cvideo signal. The Cvideo signal is applied directly to drive the CRT TV and is also transferred to the LED driving circuit for further processing to obtain a suitable signal form that can be used to drive the LED display.

The LED display includes an array of pixels, and each pixel unit consists of a red dot (R), a green dot (G), and a blue dot (B). Therefore, for the LED devices fabricated in each pixel unit, it is necessary to input digital data for combining and generating the desired video image data with prescribed colors or intensity levels. However, because these RGB dots are digitally controlled to display the associated video images, the LED display is different in structure and display method from the CRT TV. And the analog Cvideo signal needs to be further processed and decoded to digital signals before the video image can be displayed on the LCD.

The LED driving circuit is the bottom part of the circuit of FIG. 1, which includes a video decoder 111, a video amplifier 112, a D/A converter 113, a digital gamma-correction circuit 114, a synchronizing signal separator 120, an LED timing control circuit 121, a phase locked loop (PLL) circuit 122, a shut-down circuit 130, a pulse width modulator (PWM) 131 and a filtering circuit 132. As shown, in the LED driving circuit, the Cvideo signal is first received by the video decoder 111 which then decomposes the Cvideo signal into the respective analog RGB signals and the composite synchronizing signal Csync. The output analog RGB signals are then transferred to the video amplifier 112, while the output Csync signal is transferred to the synchronizing signal separator 120.

The video amplifier 112 amplifies the RGB signals to a suitable level and then transfers the amplified RGB signals to the D/A converter 113 for converting to digital signals. Gamma correction is an optional technique for adjusting the intensity and color quality of the digital signals by using the digital gamma-correction circuit 114. Meanwhile, the output Csync signal from the video decoder 111 is processed by the synchronizing signal separator 120 which decomposes the Csync signal into the original horizontal synchronizing signal Hs and the vertical synchronizing signal Vs. The horizontal synchronizing signal Hs is then transferred to both the LED timing control circuit 121 and the PLL circuit 122. The output of the PLL circuit 122 in response to the input horizontal synchronizing signal Hs is conventionally called a pixel clock signal (abbreviated as P-CLK). The LED timing control circuit 121 takes the vertical synchronizing signal Vs, the horizontal synchronizing signal Hs and the P-CLK signal as inputs, and then processes these signals to obtain the various video control signals required to drive the LED display to generate the video image.

Moreover, since the LED devices and TFT devices fabricated in the LED display both need the corresponding electrical powers for operating, two different DC voltages are required to drive the LED display. The DC voltages are produced by the PWM circuit 131 and the filtering circuit 132. The technique involved for supplying these two DC voltages by the PWM circuit 131 and filtering circuit 132 is conventional and not within the spirit of the invention, so description thereof will not be further detailed.

The LED display receives the output of the digital gamma-correction circuit 114, the output of the LED timing control circuit 121, the output P-CLK signal from the PLL circuit 122 and the output of the PWM circuit 131. These signals, in cooperation, drive the LED display to generate the video image.

When the LED display is not in active use, i.e., no video signal is received, it can be shut down by the shutdown circuit 130. This provision allows the display system to save power consumption when no video image is being displayed on the LED display.

The foregoing conventional LED driving circuit, however, has several drawbacks:

(1) The display of the digital dot-matrix data originally stored in the display memory unit 103 suffers from a reduced fidelity when being displayed on the LED display since these data are first processed into analog form so as to be displayable on the CRT TV and then processed in a reverse manner into digital form so as to be subsequently displayable on the LED display. The fidelity of the displayed image on the LED display is therefore considerably degraded.

(2) The LED driving circuit used to drive the LED display requires the use of quite a large number of circuit components, which causes the manufacturing cost of the LED driving circuit to be considerably high.

(3) Since a large number of circuit components are required, the circuit layout space on the integrated circuit is correspondingly large, causing the integrated circuit to be less compact in size, and power consumption by the LED driving circuit will be large, which makes the utilization of the display system less cost-effective.

(4) Since the Cvideo signal from the CRT TV driving circuit needs to be further processed so as to be displayable on the LED display, the LED driving circuit requires the use of a large number of circuit components to process the Cvideo signal and these circuit components, such as the voltage control oscillator (VCO) in the PLL circuit and the video decoder, require various adjustments before the LED driving circuit can be operable. These requirements considerably increase the manufacturing cost of the LED driving circuit.

SUMMARY OF THE INVENTION

It is therefore an objective of the present invention to provide a digital LED driving circuit that is implemented in an LSI integrated circuit with the purpose of overcoming the foregoing drawbacks.

In accordance with the foregoing and other objectives of the present invention, an improved digital LED driving circuit is provided. The LED driving circuit of the invention comprises a digital gamma-correction circuit, which is coupled to receive a digitized video signal, for performing a digital gamma-correction process on the digitized video signal. Further, the LED driving circuit of the invention comprises an LED timing control circuit, which is coupled to receive a plurality of video control signals associated with the digitized video signal, for converting the video control signals into an LED timing control signal to control the display of the associated digitized video signal on the LED display. Still further, the LED driving circuit of the invention comprises a PWM and shutdown circuit for supplying power to the LED display and shutting down the LED display when it has been idle for a preset period. Most of the constituent circuit components of the LED driving circuit of the invention can be implemented in a single LSI integrated circuit. The LED driving circuit of the invention is therefore compact in size, low in manufacturing cost and low in power consumption.

The present invention also discloses a displaying system which comprising a first driving circuit for driving a CRT TV to display video images and a second driving circuit for driving an LED display to display video images. The first driving circuit comprises a digital encoder for processing the output signals of a first timing control circuit and digitized displaying data stored in a display memory unit to thereby generate first video signals for the CRT TV. And the second driving circuit comprises a digital gamma-correction circuit, coupled to directly receive the digitized displaying data from the display memory unit, for performing a digital gamma-correction process on the digitized displaying data to produce second video signals for the LED display, a second timing control circuit coupled separately with the first timing control circuit and the digital gamma-correction circuit, for converting a plurality of timing signals into an LED timing control signal, and a PWM and shutdown circuit for supplying power to the LED display and shutting down the LED display when the LED display has been idle for a preset period.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENT

Figure 2:
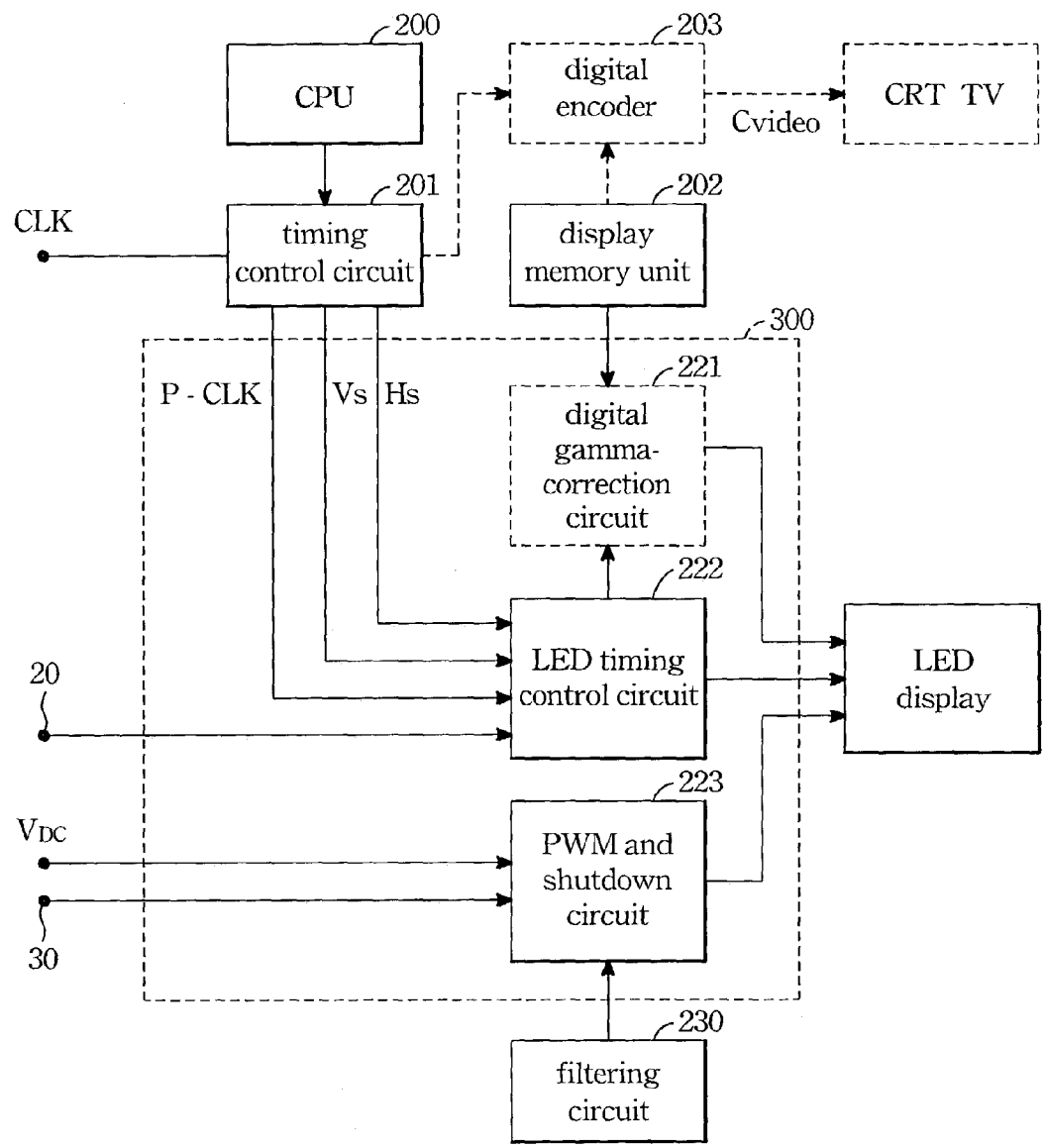
FIG. 2 is a schematic block diagram showing a preferred embodiment of the LED driving circuit according to the invention.

FIG. 2 is a schematic block diagram showing a preferred embodiment of the LED driving circuit according to the invention. The LED driving circuit is fabricated in a displaying system which also includes a CRT TV driving circuit. In FIG. 2, the driving circuit for the CRT TV includes a CPU 200, a timing control circuit 201, a display memory unit 202 and a digital encoder 203, which are operated cooperatively to produce the Cvideo signal used to drive the CRT TV. The output signals of the CPU 200 are transferred via the timing control circuit 201 to the digital encoder 203. Meanwhile, the data of a digital dot matrix stored in the display memory unit 202 are transferred to the digital encoder 203. It is noted that the display memory unit 202, for storing the digital image signals provided by the CPU 200, is an optional device. So under the consideration of saving space or cost, the display memory unit 202 can be left out. And the digital dot matrix data can be conveyed to the digital encoder 203 directly from the CPU 200.

The LED driving circuit of the invention is the bottom part of the circuit of FIG. 2 that is enclosed in a dashed box indicated by the reference numeral 300. It is devised to drive the LED display to generate the digitized video image stored in the display memory unit 202 under control of the horizontal synchronizing signal Hs, the vertical synchronizing signal Vs and the P-CLK signal from the timing control circuit 201. In practice, the LED driving circuit 300 can be implemented together with the CRT TV driving circuit in an LSI integrated circuit. Alternatively, the LED driving circuit 300 can be an independent functional unit used to drive an individual LED display.

As shown in FIG. 2, the LED driving circuit 300 includes a digital gamma-correction circuit 221, an LED timing control circuit 222 and a PWM and shutdown circuit 223.

Figure 1:
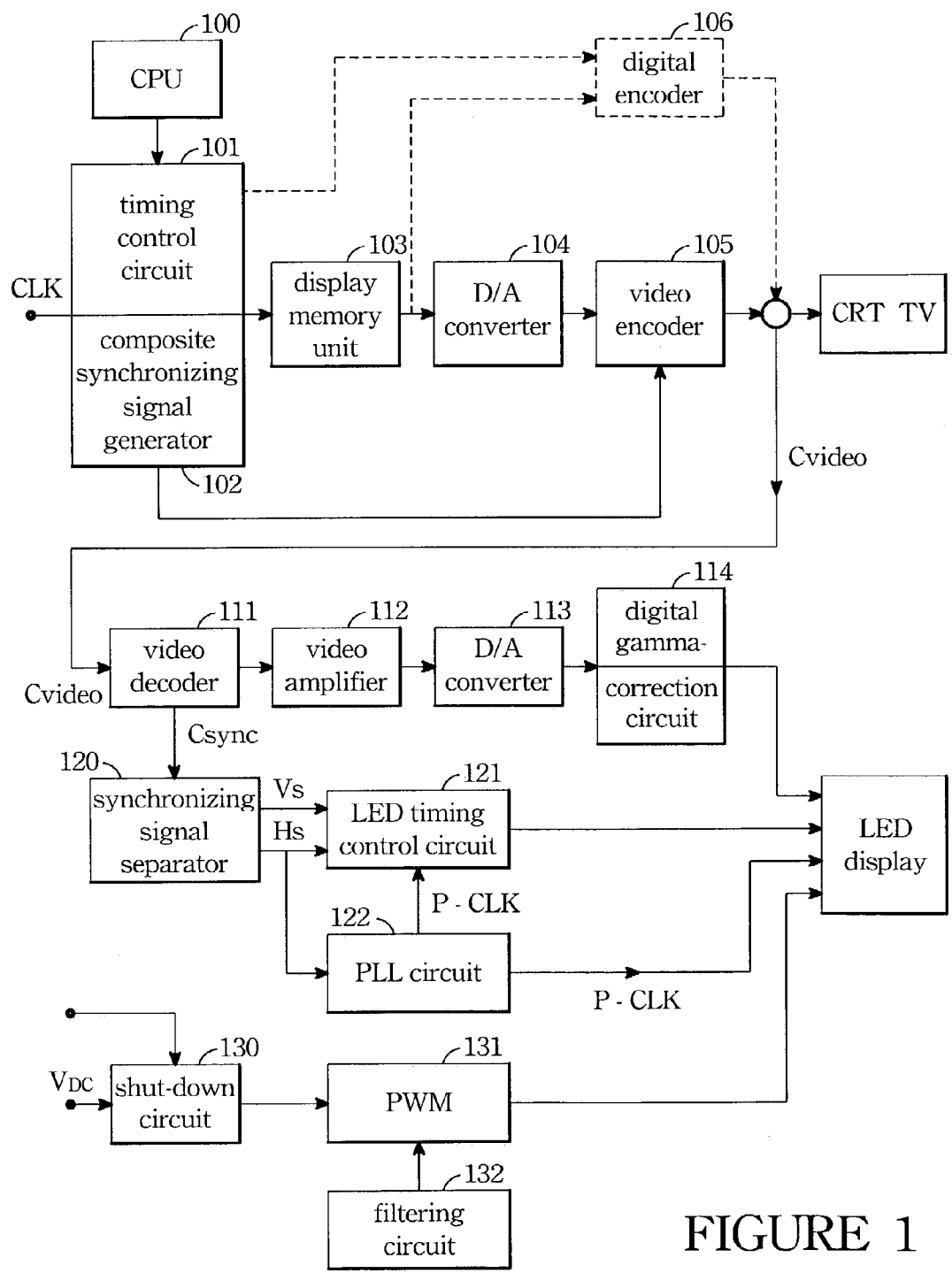
FIG. 1 is a schematic block diagram showing a conventional display driving circuit for driving a CRT TV and an LED display to generate video images.

In operation, the output horizontal synchronizing signal Hs, the vertical Synchronizing signal Vs and the P-CLK signal from the timing control circuit 201 are directly transferred to the LED timing control circuit 222 in the LED driving circuit 300. The LED timing control circuit 222 then processes these signals to thereby generate the various video control signals required to drive the LED display. Compared to the prior art of FIG. 1, in which these signals are first combined to formed the Csync signal and then decomposed to obtain their original forms to drive the LED display, it is apparent that the invention is more efficient in operation.

The LED timing control circuit 222 further includes a resolution setting means 20 that allows the user to set a desired resolution for the LED display to generate the video image. When a desired resolution is set, the LED timing control circuit 222 can adjust the LED display to the user-set resolution simply by changing the states of logic signals that are used to control the resolution of the LED display. Compared to the prior art of FIG. 1 in which the peripheral components of the PLL circuit should be changed when a different resolution is to be set, it is apparent that the invention is more convenient to use.

The digitized video image that is to be displayed on the LED display is transferred directly from the display memory unit 202 to the digital gamma-correction circuit 221. The digital gamma-correction circuit 221 performs a digital gamma-correction process on the digitized video signal. Compared to the prior art of FIG. 1 in which the digitized video signal from the display memory unit 103 are processed through many stages (i.e., the D/A converter 104, the video encoder 105, the video decoder 111, the video amplifier 112) before being received and processed by the D/A converter 113 and the digital gamma-correction circuit 114, it is apparent that the invention is more efficient in operation and makes the overall circuit structure less complex.

Furthermore, the LED driving circuit 300 utilizes the PWM and shutdown circuit 223 to provide all the DC voltages needed to power the various parts of the LED display. In operation, the PWM and shutdown circuit 223 receives an external voltage VDC and, in conjunction with the filtering circuit 230, converts the voltage VDC into the various DC voltages that are used to power the various parts of the LED display.

The PWM and shutdown circuit 223 further includes a shutdown trigger input port 30. When the LED display has been idle for a preset period, a shutdown trigger signal will be input to the PWM and shutdown circuit 223 via this port 30, causing the PWM and shutdown circuit 223 to shut down the LED display for the purpose of saving power consumption.

In conclusion, the LED driving circuit of the invention has the following advantages over the prior art.

(1) Since most of the constituent circuit components of the LED driving circuit (except the filtering circuit) can be implemented in a single LSI integrated circuit, the IC product of the LED driving circuit is very compact in size, low in manufacturing cost, and low in power consumption.

(2) The overall display driving circuit for the CRT TV and LED display is also more simplified in structure while nonetheless provides the same driving function with even greater improvement in performance and fidelity.

(3) The invention allows the digitized video signal to be directly digitally processed so that the video image can be displayed without much loss in fidelity. It also allows the driving circuit to be more cost-effective to implement and to be constructed with a reduced number of circuit components. The LED driving circuit consumes less power and can be operated without the need to make the many analog adjustments of the prior art.

(4) The digital gamma-correction circuit 221 performs the gamma correction on the video signal in a digital manner instead of analog manner as in the prior art. The gamma correction can thus be performed based on the characteristics of the LED display to provide the optimal and finest correction.

(5) The digital nature of the LED driving circuit of the invention allows the various resolutions of the LED display to be selectable through digital means (in this case, the resolution setting means 20). The resolution setting is therefore more convenient than the prior art in which some peripheral components of the PLL circuit need to be replaced when a different resolution is to be set.

The invention has been described using exemplary preferred embodiments. However, it is to be understood that the scope of the invention is not limited to the disclosed embodiments. On the contrary, it is intended to cover various modifications aid similar arrangements. The scope of the claims, therefore, should be accorded the broadest interpretation so as to encompass all such modifications and similar arrangements.

What is claimed is:

1. A digital display driving circuit of light emitting diode (LED) displays for driving LED displays to display video images, comprising:
   a digital gamma-correction circuit, coupled to directly receive digitized displaying data from a display memory unit, for performing a digital gamma-correction process on the digitized displaying data to produce video signals;
   an LED timing control circuit, coupled separately with an external time control circuit and said digital gamma-correction circuit, for converting a plurality of timing signals into an LED timing control signal; and
   a PWM and shutdown circuit for supplying power to the LED display and shutting down the LED display when the LED display has been idle for a preset period.

2. The digital display driving circuit of claim 1, wherein said digital gamma-correction circuit is coupled to a central process unit (CPU) so as to fetch the digitized displaying data directly via said CPU.

3. The digital display driving circuit of claim 1, wherein said digital gamma-correction circuit is coupled to said display memory unit in which the digitized displaying data are stored, so as to fetch the digitized displaying data directly from said display memory unit.

4. The digital display driving circuit of claim 1, wherein said plurality of timing signals received by said LED timing control circuit include a horizontal synchronizing signal, a vertical synchronizing signal and a pixel clock signal.

5. The digital display driving circuit of claim 1, wherein said LED timing control circuit comprises a means for setting a user-desired resolution for the LED display to display the video image based on a logic signal representative of the user-set resolution.

6. The digital display driving circuit of claim 1, wherein said PWM and shutdown circuit is used in conjunction with a filtering circuit to convert an input DC voltage to the power required to drive the LED display, and said PWM and shutdown circuit shuts down the LED display in response to a shutdown trigger signal.

7. A displaying system, comprising a first driving circuit for driving a CRT TV to display video images and a second driving circuit for driving an LED display to display video images, wherein said first driving circuit comprises a digital encoder for processing the output signals of a first timing control circuit and digitized displaying data stored in a display memory unit to thereby generate first video signals for the CRT TV, and said second driving circuit comprises
- a digital gamma-correction circuit, coupled to directly receive the digitized displaying data from said display memory unit, for performing a digital gamma-correction process on the digitized displaying data to produce second video signals for the LED display;
- a second timing control circuit, coupled separately with said first timing control circuit and said digital gamma-correction circuit, for converting a plurality of timing signals into an LED timing control signal; and
- a PWM and shutdown circuit for supplying power to the LED display and shutting down the LED display when the LED display has been idle for a preset period.

8. The displaying system of claim 7, wherein said signal gamma-correction circuit is coupled to said CPU so as to fetch the digitized displaying data directly from said CPU.

9. The displaying system of claim 7, wherein said digital gamma-correction circuit is coupled to said display memory unit in which the digitized displaying data are stored, so as to fetch the digitized displaying data directly from said display memory unit.

10. The displaying system of claim 7, wherein said plurality of timing signals received by said second timing control circuit include a horizontal synchronizing signal, a vertical synchronizing signal and a pixel clock signal.

11. The displaying system of claim 7, wherein said second timing control circuit comprises a means for setting a user-desired resolution for the LED display to display the video image based on a logic signal representative to the user-set resolution.

12. The displaying system of claim 7, wherein said PWM and shutdown circuit is used in conjunction with a filtering circuit to convert an input DC voltage to the power required to drive the LED display, and said PWM and shutdown circuit shuts down the LED display in response to a shutdown trigger signal.

* * * * *